Patented Sept. 30, 1947

2,428,235

UNITED STATES PATENT OFFICE 2,428,235

PRODUCTION OF AROMATIC HYDROXY ETHERS

Kenneth E. Marple, Edward C. Shokal, and Theodore W. Evans, Oakland, Calif., assignors to Shell Development Company, San Francisco, Calif., a corporation of Delaware No Drawing. Application October 19, 1942, Serial No. 462,624

3 Claims. (Cl. 260—613)

This invention relates to a catalytic process for the production of aromatic hydroxy ethers. More particularly, the invention pertains to a catalytic process of reacting an epoxide compound with a phenol in the presence of certain highly active metal halide catalysts, the reaction of the process yielding the valuable aromatic hydroxy ethers.

The reaction of phenols with olefin oxides is known to the art. U. S. Patent No. 1,633,927 mentions the reaction of phenol with olefin oxides, while U. S. Patent No. 1,730,061 shows the reaction of propylene oxide with phenol. Neither of these patents mentions the use of catalysts for the reaction. Each describes the use of high temperature and pressure in effecting the desired reaction.

The use of catalysts for the reaction is, however, known to the art. German Patent No. 519,730 describes the reaction of phenol with ethylene oxide using alkali phenolates as catalyst. British Patent No. 380,431 recommends the use of various substances as catalyst in reacting ethylene oxide with water-insoluble phenols like xylenols and xylorcins such as bleaching earths or active charcoal, sulfuric or phosphoric acids, sodium or potassium bisulfates and caustic soda or alkali metal alcoholates. The catalyst disclosed for use in reacting olefin oxides with phenols in British Patent No. 467,332 are tertiary amines or quaternary ammonium bases, while British Patent No. 469,332 proposes the use of what are termed "dehydrated metal oxides" as catalyst for the same reaction.

Although the reaction of an epoxide compound with a phenol to give aromatic hydroxy ether occurs in the absence of a catalyst as shown in the art, the requirement that high temperatures be used with correspondingly high pressures which are necessary to keep the reactants in the liquid phase in which the reaction occurs is disadvantageous and necessitates the use of expensive high-pressure equipment for operation of such a process. While substances which have been proposed for use as catalyst for the reaction do increase the reaction rate to various degrees, depending upon the particular materials employed, it has been found by us that certain metal halides are more active and considerably more suitable as catalysts for the reaction.

It is therefore an object of the present invention to provide a catalytic process for producing aromatic hydroxy ethers by reacting a phenol with an epoxide compound in the presence of a metal halide catalyst.

Another object of the invention is to provide a practical and economical catalytic process which is adapted to the technical scale production of aromatic ethers by reaction of a phenol with an epoxide compound. A further object is to provide a process utilizing the highly active catalytic properties of certain metal halides, in particular stannic chloride, for the manufacture of aromatic hydroxy ethers.

These and other objects of the invention may be accomplished by the process of the invention, which in its broad aspects comprises reacting an epoxide compound such as an alkylene oxide or a substitution product thereof with a phenol in the presence of a metal halide catalyst. The reaction involved in the production of the aromatic hydroxy ethers may be represented by the following equation:

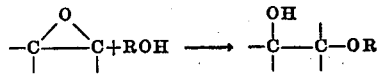

wherein

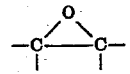

designates the reaction group of the epoxide compound. ROH designates the phenol, and

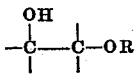

designates essential groups of the reaction product, an aromatic hydroxy ether. We have found that this reaction can be made to proceed at a practicable rapid rate with a resultant high yield of the desired ether if it is conducted in the liquid phase in the presence of a stannic halide, an antimony pentahalide, an aluminum halide, a zinc halide, or a ferric halide. This group of metal halides, especially stannic halide and antimony pentahalide and in particular stannic chloride, possess some peculiar property not at present fully understood which enables them to greatly increase the rate of the liquid phase reaction between an epoxide compound and a phenol. The high catalytic activity of this group of catalysts makes them attractive to employ in the process, since only small amounts are required to effect a substantially complete reaction in a short time. The actual amount of catalyst needed in the process, however, will be dependent upon a number of factors including the particular metal halide catalyst used, the particular reactants employed, the water content of the reaction mixture and the operating conditions utilized. In general, the larger amount of catalyst present in the reaction mixture the more rapid will be the reaction. Satisfactory results are obtained ordinarily with catalyst concentrations in the reaction mixture in the very small amount of from .1 to 1%. If advantageous and desired, more or less than this amount is used.

The metal halide catalysts employed in the process are hydrolyzable compounds when in the presence of water. Furthermore, their catalytic activity is considerably impaired when they are in a hydrolyzed condition, and larger amounts of catalyst are required to effect the reaction when the reaction mixture contains appreciable amounts of water as compared to when it is substantially dry. Also, the hydrogen halide liberated by the hydrolysis of the metal halide may combine with the epoxide compound to form halohydrin types of by-products which are troublesome to remove from the desired product. It is therefore preferable for the reaction mixture to be in a substantially anhydrous condition during execution of the reaction used in the process of the invention.

The epoxide compound which may be used in the process are the compounds which contain not more than four atoms in the heterocyclic epoxide ring, i. e., compounds which contain 1.2- and 1.3-oxide groups. Representative compounds include the alkylene oxides such as ethylene oxide, propylene oxide, butene-1 oxide, butene-2 oxide, isobutylene oxide, trimethylene oxide, butadiene monoxide, butadiene dioxide, cyclopentylene oxide, styrene oxide, etc., as well as substituted alkylene oxides which contain various substituent groups in addition to the epoxide group like the epihalohydrins such as epichlorhydrin, epibromhydrin, alpha methyl epichlorhydrin, beta methyl epichlorhydrin, alpha alpha' dimethyl epibromhydrin, etc.; nitro epoxide compounds such as nitro glycide, beta ethyl nitro glycide, nitro styrene oxide, etc.; epoxide ethers such as methyl glycidyl ether, isopropyl glycidyl ether, secondary butyl beta-methyl glycidyl ether, cyclopentyl glycidyl ether, phenyl glycidyl ether, etc.; epoxide thioethers such as ethyl glycidyl thioether, cyclohexyl alpha methyl thioether, tolyl glycidyl thioether, etc.; epoxide esters such as glycidyl acetate, glycidyl propionate, beta propyl glycidyl naphthenate, glycidyl benzoate, etc., and the like.

The epoxide compound is reacted with a phenol in the process of the invention. The expression "a phenol" as used in this specification and the appended claims is recognized generally in the art as an aromatic compound which contains a hydroxy group linked directly to a carbon atom of an aromatic nucleus ring. A phenol employed as a reactant in this process is either a mono hydroxy or a poly hydroxy compound, and contains, if desired, other substituents linked directly to the aromatic nucleus. The preferred reactants in the process are compounds containing only a single hydroxy group linked to the aromatic nucleus and compounds known as alkylated mono hydroxy phenols which contain a single hydroxy group linked directly to a carbon atom of the aromatic nucleus and one or more alkyl groups linked to other carbon atoms of the ring. Particular representative compounds include phenol, the cresols, the xylenols, ethyl phenol, propyl phenol, tertiary butyl phenol, tertiary amyl phenol, octyl phenol, resorcinol, brom cresol, chlor phenol, catechol, orcinol, pyrogallol, phlorglucinol, eugenol, trinitro phenol, and the like. Less preferred phenols are those which contain, in addition to the phenolic hydroxy group such groups as alcoholic hydroxy groups, amino groups, carboxyl groups, carboxylic acid groups, etc., which are also reactive with an epoxide compound in competition with the phenolic hydroxy groups.

The molecular proportion of the phenol employed in the process is preferably in considerable excess of the epoxide compound. Ordinarily a molecular ratio of at least two of the phenol to one of the epoxide compound is employed. High yields of the desired aromatic hydroxy ether are attained when the reaction mixture contains 3 to 5 mols of the phenol per mole of epoxide compound. The excess phenol remaining after the reaction is recovered by extraction, distillation or the like and is returned to the process for reaction with additional epoxide compound. The reaction is conducted at a temperature of from about −50° C. to 250° C. Cooling the mixture of reactants so that it is below room temperature, say from about 10° to −50° C. when the metal halide catalyst is added thereto is advantageous, since such a procedure has an effect on the amount of catalyst which must be used to produce a desired reaction rate. In general, this procedure considerably reduces the amount of catalyst necessary as compared to when the catalyst is added to the reaction mixture at ordinary or elevated temperatures and is of importance in the technical scale manufacture of the aromatic hydroxy ethers, wherein it is desirable to keep the catalyst consumption at a minimum. In other words, it is preferred to first cool the reactants to the low temperature and then add the catalyst. The reaction begins immediately upon contact of the reactants with the catalyst, and while it may initially be slow at the low temperatures, it soon becomes vigorous with a resulting increase in temperature of the reaction mixture. In general, the reaction may be completed by heating the reaction mixture at its boiling temperature, except when a low boiling reactant such as ethylene oxide, propylene oxide, etc., is used. In such cases where higher temperatures than the normal boiling temperature of the reaction mixture are used, it is desirable to maintain a pressure on the reaction mixture at least equal to the total vapor pressure of the mixture at the operating temperature, since the reaction occurs in the liquid phase. The process of the invention may be executed in a variety of manners, and is adaptable to batchwise intermittent and continuous operation. For example, a mixture of the epoxide compound and the phenol is prepared and cooled to a temperature below ordinary room temperature. To this mixture a metal halide catalyst is then added, followed by gentle heating to initiate the reaction. The reaction between the epoxide compound and the phenol is exothermic, so that the reaction may become sufficiently rapid to favor a considerable amount of heat which may raise and maintain the temperature at the boiling point for a period of time without further application of external heat. Owing to the spontaneous and possibly violent character of the reaction when using the metal halide catalyst, it may be desirable to apply cooling to the reaction mixture after initiating the reaction by heating so as to keep it under control. The reaction is allowed to proceed satisfactorily with the reaction mixture contained in a vessel fitted with heating and cooling means as well as suitable condensing means such as a reflux condenser for condensing and returning any vapors of reactants which may be evolved. In order to insure completion of the reaction, the reaction mixture is heated or boiled for a period of time during which samples may be withdrawn and analyzed to determine whether the reaction is substantially complete. Upon completion of the reaction, the catalyst may, if desired, be neutralized and destroyed by treatment with a basic acting substance such as sodium carbonate, although this is not imperative. The unreacted components of the reaction mixture and the products of the reaction are separated in any suitable manner such as by distillation and/or extraction with a suitable solvent.

An alternative method of operation is to add the catalyst to the phenol and subsequently introduce the epoxide compound either as a whole or in portions, into the mixture. In general, it is inadvisable to add the catalyst to the epoxide compound in the absence of the phenol. This procedure is to be avoided because of the tendency of the epoxide compound to react with itself in the presence of the highly active catalyst and to form less valuable and usually undesirable by-products.

Continuous operation may be achieved by passing the mixture of reactants and catalysts through a tubular reactor, for example, at such a rate that substantially complete reaction is obtained during the time of residence of the mixture in the reactor. The reactor is heated in any suitable manner, so that the mixture is at the desired temperature and pressure may be applied, if necessary, to keep the reactants liquid.

The following example is given as an illustration of the operation of the process of the invention, it being understood that the example is not in any way to be construed as limitative of the invention in the particular reactants, catalyst or conditions described therein:

A reaction mixture consisting of about 1.5 mols of para tertiary amyl phenol, 0.5 mol of epichlorhydrin and 0.005 mol of stannic chloride was mixed and heated at 95° C. Iso-octane was then added and the greater part of the excess phenol crystallized out. The residue was then vacuum distilled and the cut boiling from about 140 to 154° C. at 0.5 mm. was analyzed. The analysis indicated the presence of 12.95% chlorine, 66.05% carbon and 8.6% hydrogen. The compound

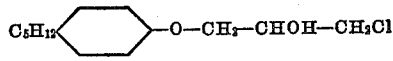

theoretically contains 14.0% chlorine, 65.5% carbon and 8.3% hydrogen.

This application is a continuation-in-part of our copending application Serial No. 305,166, filed November 18, 1939, now Patent No. 2,327,053, issued August 17, 1943.

We claim as our invention:

1. A process for the production of an aromatic hydroxy ether which comprises reacting an epoxide compound with a phenol in the presence of stannic chloride.

2. A process for the production of an aromatic hydroxy ether which comprises reacting under substantially anhydrous conditions an epoxide compound with a phenol in the presence of stannic chloride.

3. A process for the production of an ether of phenol which comprises reacting epichlorhydrin with phenol in the presence of stannic chloride.

KENNETH E. MARPLE.
EDWARD C. SHOKAL.
THEODORE W. EVANS.

REFERENCES CITED

The following references are of record in the file of this patent:

UNITED STATES PATENTS

| Number | Name | Date |
|---|---|---|
| 2,094,100 | Dreyfus | Sept. 28, 1937 |
| 2,130,526 | Coleman | Sept. 20, 1938 |
| 2,141,443 | Stanley | Dec. 27, 1938 |
| 2,213,477 | Steindorff | Sept. 3, 1940 |
| 2,253,342 | Mikeska | Aug. 19, 1941 |
| 2,276,597 | Stanley | Mar. 17, 1942 |
| 2,327,053 | Marple et al. | Aug. 17, 1943 |

FOREIGN PATENTS

| Number | Country | Date |
|---|---|---|
| 470,181 | Great Britain | Aug. 3, 1937 |